United States Patent
Roberts et al.

(10) Patent No.: US 6,839,210 B2
(45) Date of Patent: Jan. 4, 2005

(54) BUS TOTAL OVERCURRENT SYSTEM FOR A PROTECTIVE RELAY

(75) Inventors: Jeffrey B. Roberts, Viola, ID (US); David E. Whitehead, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 87 days.

(21) Appl. No.: 10/280,206

(22) Filed: Oct. 25, 2002

(65) Prior Publication Data

US 2004/0080884 A1 Apr. 29, 2004

(51) Int. Cl.$^7$ ............................................. H02H 3/00
(52) U.S. Cl. ........................................................ 361/64
(58) Field of Search ......................... 361/62–64, 67–69, 361/87, 42; 324/522, 512; 702/59

(56) References Cited

U.S. PATENT DOCUMENTS

| | | | | |
|---|---|---|---|---|
| 4,513,340 A | * | 4/1985 | Drain | 361/62 |
| 4,670,811 A | * | 6/1987 | Eda | 361/45 |
| 5,793,750 A | * | 8/1998 | Schweitzer et al. | 370/242 |
| 6,008,971 A | * | 12/1999 | Duba et al. | 361/64 |
| 6,256,592 B1 | * | 7/2001 | Roberts et al. | 702/59 |
| 6,496,342 B1 | * | 12/2002 | Horvath et al. | 361/65 |
| 6,518,767 B1 | * | 2/2003 | Roberts et al. | 324/521 |
| 6,525,543 B1 | * | 2/2003 | Roberts et al. | 324/522 |
| 6,590,397 B2 | * | 7/2003 | Roberts | 324/521 |
| 6,650,969 B1 | * | 11/2003 | Sieleman | 700/292 |
| 6,697,240 B2 | * | 2/2004 | Nelson et al. | 361/64 |

* cited by examiner

*Primary Examiner*—Ronald Leja
(74) *Attorney, Agent, or Firm*—Cook, Alex, McFarron, Manzo, Cummings & Mehler, Ltd.

(57) ABSTRACT

A power system bus total overcurrent system is used with a part of a power system which includes two buses and first and second power line portions which extend between them. A protective relay system includes protective relays for each of the first and second power line portions, located near the two buses, wherein the relays determine the total current into and out of each bus. The bus total overcurrent system includes first and second communication lines between each pair of relays and another communication line which extends between the first and second communication lines. In a current balance arrangement, the relays measure difference current using the same communication line arrangement between the two pairs of relays to determine a fault condition. Fault determinations are made in each case by the protection algorithms from total and difference currents.

6 Claims, 4 Drawing Sheets

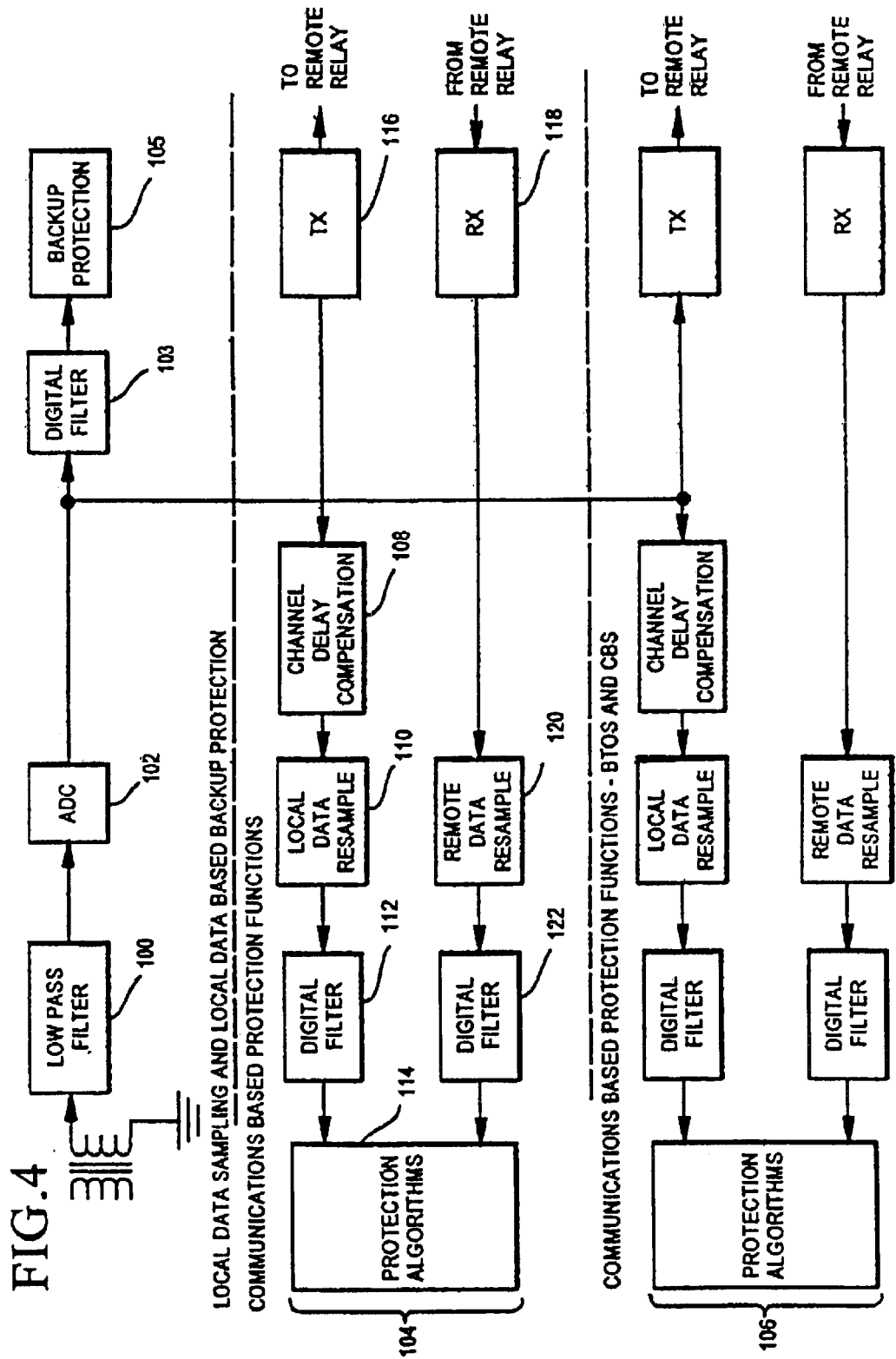

BUS TOTAL OVERCURRENT SYSTEM FOR A PROTECTIVE RELAY

TECHNICAL FIELD

This invention relates generally to overcurrent elements in a protective relaying system for detecting overcurrent conditions on a power system, and more specifically concerns a power line bus total overcurrent relay for determining total overcurrent on a bus.

BACKGROUND OF THE INVENTION

A bus is a portion of an electric power system from which individual feeder lines extend to individual users. Typically, the bus will include three-phase current values and $I_A$, $I_B$, $I_C$ and three phase voltage values $V_A$, $V_B$ and $V_C$. Many electric power protection applications include a bus total overcurrent system (BTOS), which measures all of the current entering and leaving a protected bus. The vector sum of the currents flowing through the circuit breakers connected to the bus is useful as an input to a time overcurrent element in a protective relay.

FIG. 1 shows a typical BTOS arrangement involving two feeder lines. With an electromechanical or other static relay, the three-phase currents on the breakers connected to the bus provide the BTOS value. For the circuit arrangement of FIG. 1, involving a source S referred to at 10, and feeder lines 12 and 14, the three-phase current at breakers 16 and 18 provide the BTOS current value for bus 20. The power system shown in FIG. 1 also includes a transformer 17 and a relay 19 for the transformer, associated with circuit breaker 22. To obtain the BTOS value for bus 20 in the circuit of FIG. 1, the polarity marks of current transformers 21 and 23 are arranged in common (hard wired), with the results connected to the relay 25. The relay arrangement of FIG. 1 will measure the total fault current for bus 20, but will measure zero current for out-of-section faults. The same is true for bus 24 and the arrangement of the protective relay, the circuit breakers and the current transformers associated therewith.

The traditional BTOS application has certain disadvantages; for instance, it is undesirable that the BTOS arrangement provides high-speed tripping in response to transformer low-voltage side faults. This is typically corrected by desensitizing the arrangement of FIG. 1. Tripping by the BTOS time overcurrent element will also typically delay the high speed tripping process, although this is frequently resolved by using a high set overcurrent element. Further, in those situations where the strength of the source 10 changes significantly over time, security can be compromised if there are no compensating elements. Hence, there are disadvantages and limitations of existing BTOS arrangements.

SUMMARY OF THE INVENTION

Accordingly, the invention in one aspect comprises a power system bus total overcurrent system for use with part of a power system which includes two buses and first and second power lines which extend therebetween, comprising: a protective relay system, which includes protective relays associated with each of the first and second power lines, the protective relays being located near the power buses, such that a first pair of relays measures current into and out of a first bus and a second pair of relays measures current into and out of a second bus; first and second communication lines which are connected, respectively, between the first pair of relays and a second pair of relays; and a third communication line connected between the first and second communication lines at the first and second buses, resulting in total current values into and out of the first and second buses.

Another aspect of the present invention is a power system current balance protection system for use with part of a power system which includes two buses and first and second power lines which extend between the two buses, comprising: a protective relay system which includes protective relays associated, respectively, with each of the first and second power lines, such that a first pair of relays measure current into and out of a first bus and a second pair of relays measure current into and out of a second bus, wherein each pair of relays process the current values into and out of its associated bus to determine the vector different current on each bus, wherein a difference current on the bus of at least a preselected amount results in a trip a circuit breaker at that location, which in turn results in a trip of a circuit breaker at the other end of a line adjacent the other bus.

BRIEF DESCRIPTION OF THE DRAWINGS

FIG. 4 is a block diagram of the data flow for a protective relay using the BTOS system of the present invention.

BEST MODE FOR CARRYING OUT THE INVENTION

Figure 2:
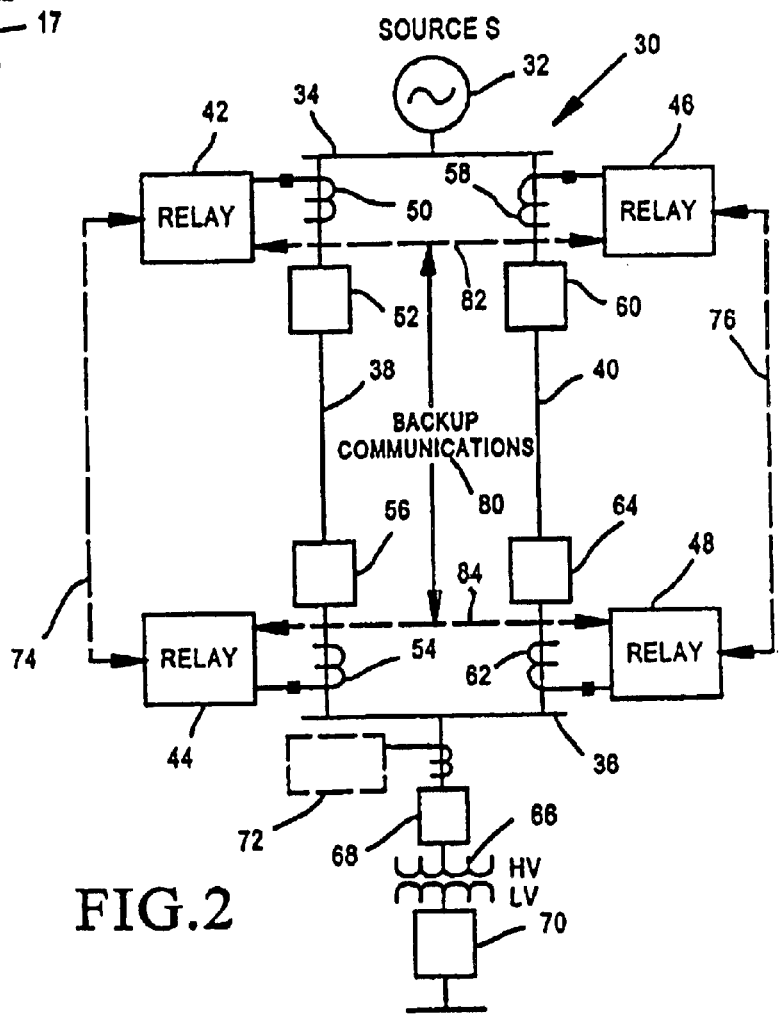
FIG. 2 shows the total bus overcurrent system of the present invention.

Referring now to FIG. 2, a bus total overcurrent system (BTOS) of the present invention is shown. The system of FIG. 2, shown generally at 30, includes a source 32 for buses 34 and 36, with feeder lines 38 and 40 extending between them. Line 38 has relays 42 and 44 associated therewith at opposing ends of the line. Line 40 has relays 46 and 48 associated therewith at opposing ends of that line. Relay 42 is provided current values from power line 38 through current transformer (CT) 50 with circuit breaker 52 associated therewith. Relay 44 has current values provided by CT 54, with circuit breaker 56 associated therewith. Relay 46 has current values provided by CT 58, with circuit breaker 60 associated therewith, while relay 48 has current values provided by CT 62, with and circuit breaker 64 associated therewith.

Transformer 66 is connected to bus 36 with circuit breakers 68 and 70 positioned on the high-voltage side and low-voltage side, respectively, of the transformer, with relay 72 associated therewith. FIG. 2 is shown with current differential protection for feeder lines 38 and 40. Relays 42 and 44 provide current differential protection for line 38, with a primary communications channel 74. Relays 46 and 48 also have a primary communications channel 76 for current differential protection for line 40. These channels could be wire, fiber or other communication links. The primary communication channels 74 and 76 provide a conventional current differential communication function between the two relays (referred to as local and remote relays) for each line. The current differential processing functions are carried out in the two relays associated with each line, for example relays 42 and 44 for line 38. The principles of current differential protection are well known, and hence are not explained in detail herein.

In current differential protection, as well as other protection arrangements, such as directional comparison protection, a backup communication channel is usually provided, which is typically designated as a "hot standby" communication line. The backup communication channel typically parallels the primary communication channel. In the present invention, however, such a backup channel, which is shown at 80 in FIG. 2, is also used to provide a BTOS capability, in addition to the communication backup function. The backup communication line or channel 80, however, instead of extending in conventional fashion directly between its associated pair of relays, for instance relays 42 and 44, as a backup to channel 74, is connected between a first bus end communication channel or line 82 which extends between relays 42 and 46 and a second bus end communication channel 84 which extends between relays 44 and 48. Hence, communication line 80 services the relays associated with the buses 34 and 36 with both a BTOS and a current differential backup capability.

With the arrangement of FIG. 2, the total currents entering and leaving each bus can be efficiently determined, which can then be used to determine the total current for each bus. This information can then be applied to the conventional protection algorithms in the relays for a decision with respect to a possible fault condition. The key structure permitting the arrangement of FIG. 2 to be used for BTOS is the first and second bus end communication lines 82, 84 between relays 42 and 46 and between relays 44 and 48, respectively, with communication line 80 extending between those two lines. A conventional backup communication line in a current differential protection system can be used as part of a system which provides BTOS information in addition to the conventional backup function.

The arrangement of FIG. 2 for BTOS provides the following advantages. It does not require dedicated current transformers (CTs), as do conventional BTOS arrangements. The current transformers supply the individual relays with current values used for both current differential and BTOS functions. Further, each CT is independent, i.e. each CT services a single relay. This reduces the complexity of the CT wiring. Still further, the use of communication channels to provide the required current information for the BTOS determination has the possibility of an automatic self-checking process capability to increase or at least maintain present levels of security. Still further, the arrangement shown can provide bus differential protection while ensuring coordination for transformer low-voltage side faults without the requirement of under voltage distance element protection.

While the circuit of FIG. 2 is advantageous in the context of a current differential system or other protective relay function involving communication of electric current data between two protective relays at local and remote ends of a line, a primary communications channel is not necessary for BTOS protection (it is necessary for differential protection) if current differential protection is not to be implemented; the key structural concept is the use of a bus-end communication lines between the relays on the lines connected to a given bus, and a communication line between those bus-end communication lines.

Figure 1:
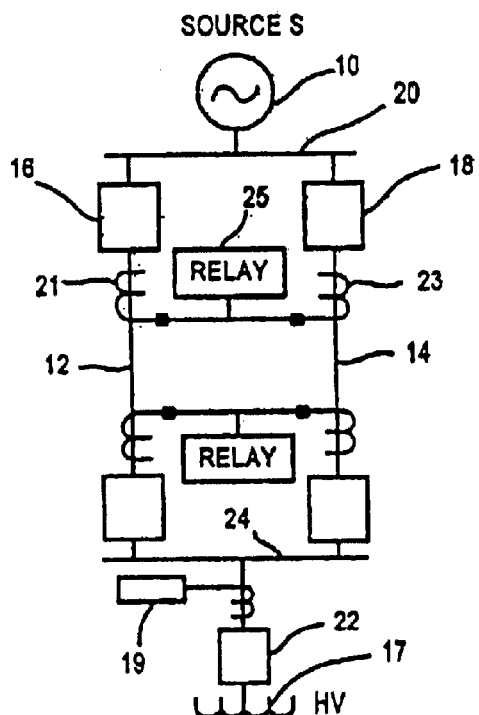
FIG. 1 shows a prior art bus total overcurrent application with two power lines and two bus lines.

Further, with a contact input from the transformer relay, or relay-to-relay communication, the arrangement of FIG. 2 also makes possible coordination for transformer low-voltage side faults without the need for under-voltage or distance element supervision, thus overcoming one of the disadvantages of the prior art arrangement of FIG. 1.

Figure 3A:
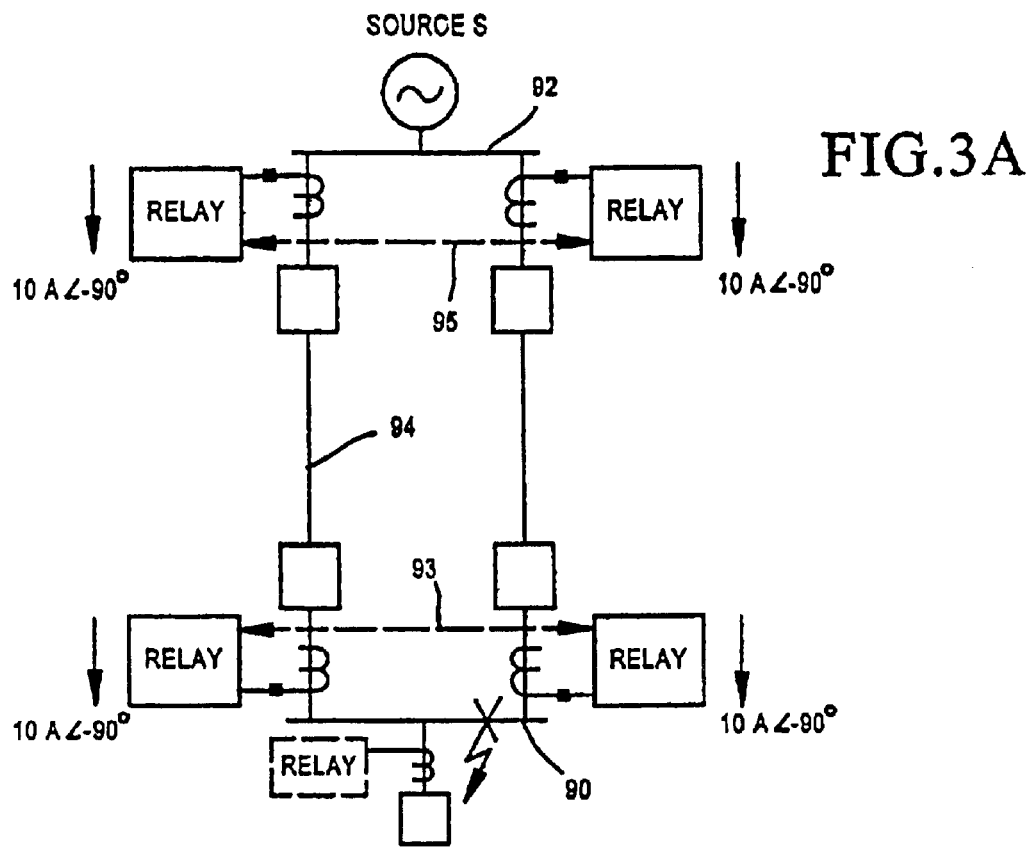
FIGS. 3A, 3B and 3C are illustrations of a current balance arrangement and operation for a two-line, two-bus arrangement.
Figure 3B:
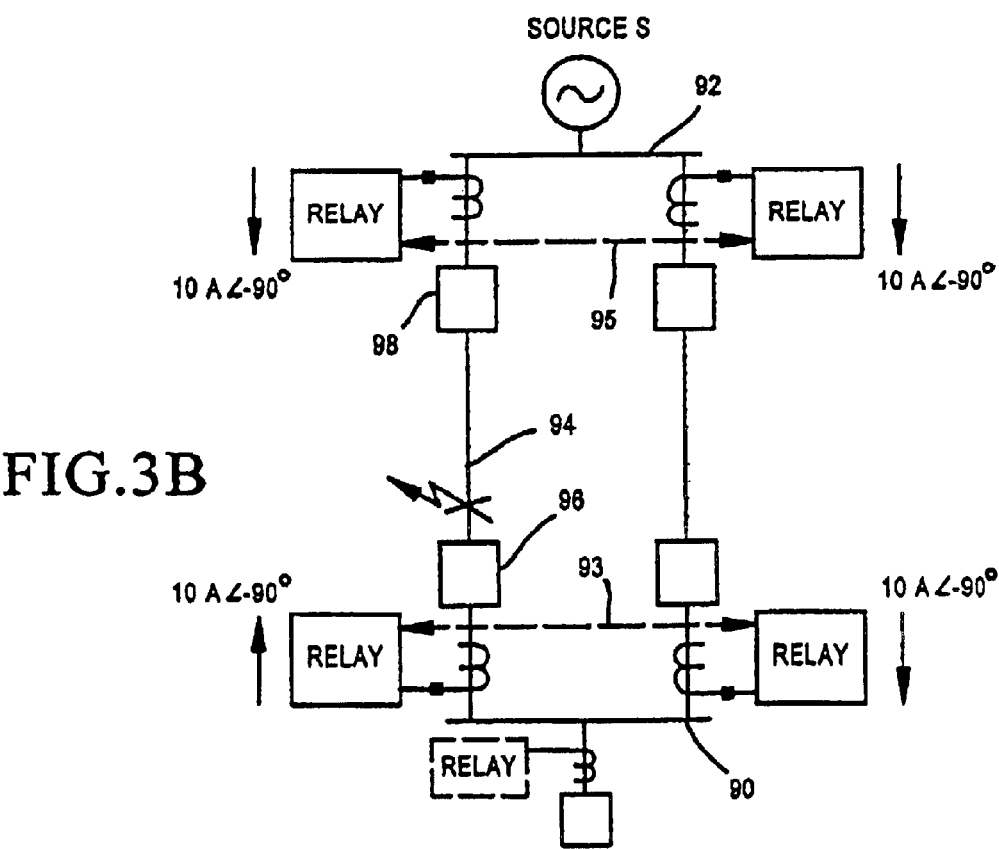
Figure 3C:
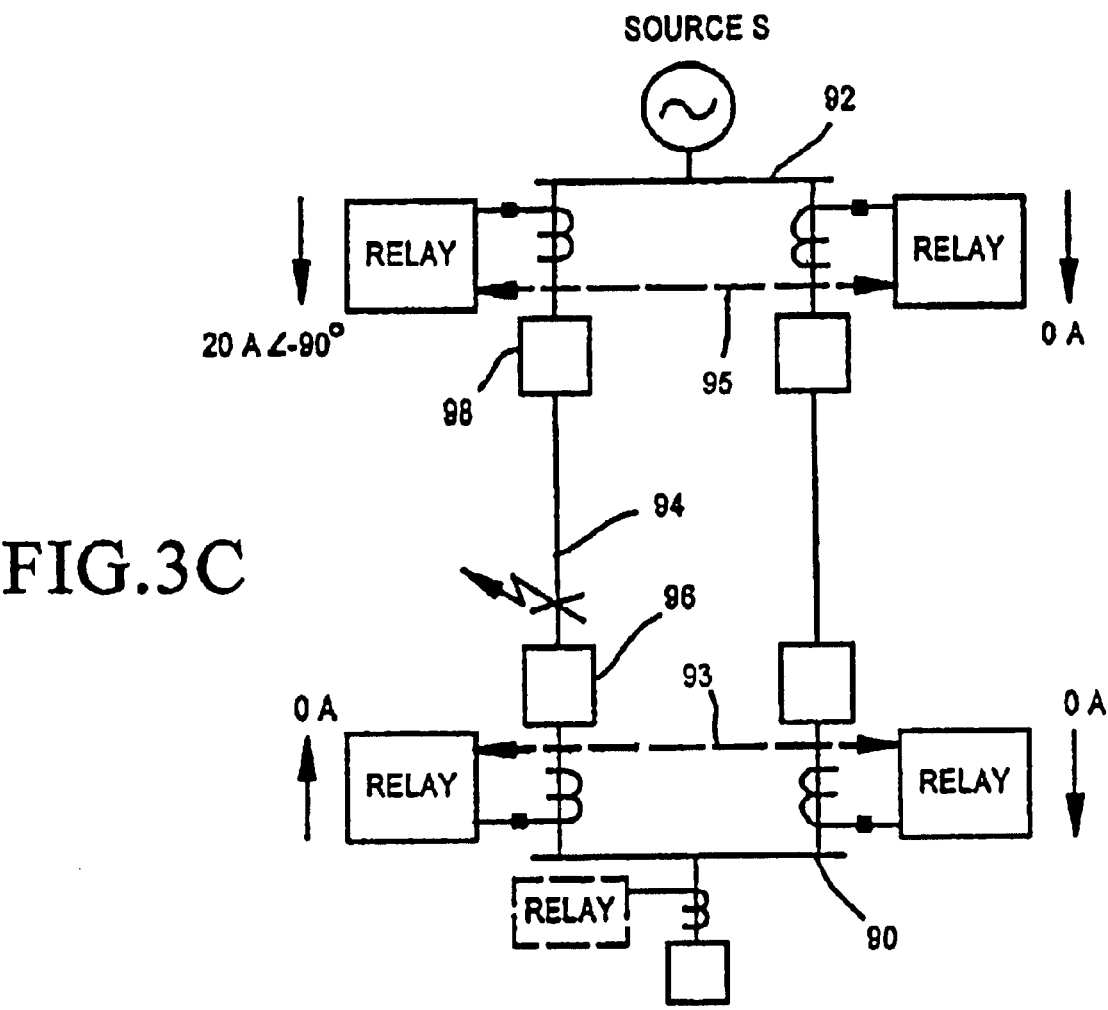

FIGS. 3A, 3B and 3C show a protection arrangement, referred to as a current balance relay system, used in substation applications. A current balance system (CBS) is similar to a BTOS system, in that the balance relay measures the currents from each line relative to a bus. The vector difference between the currents is used, however, instead of the vector sum. The current balance system can be used to provide high-speed protection when the communications channel is out of service or it can be used to parallel the main line protection function.

Referring to FIG. 3A, which shows a fault on bus 90, the vector difference in the current magnitudes, measured by the current balance system for buses 90 and 92, are both zero. In the case of a fault on line 94 near bus 90 (FIG. 3B), the current balance system measures zero for bus 92, but measures a substantial difference current for bus 90, resulting in the tripping of breaker 96. After breaker 96 opens, the current balance system will measure a substantial difference current at bus 92, resulting in the tripping of breaker 98 (FIG. 3C).

Hence, the protection action is a sequential trip of breakers 96 and 98 protecting the faulted line 94. While this sequential tripping causes the system to be faulted longer than if the respective breakers were to trip via conventional protection arrangement, it is much faster than that accomplished by a time-delayed distance or directional overcurrent element, and does not require separate or dedicated potential transformers; rather only communication lines 93, 95, respectively, between the two relays at bus 90 and the two relays at bus 92.

FIG. 4 shows a simplified diagram of the data flow for a protective relay incorporating both BTOS and CBS functions. Generally, the local currents and voltages from the power line will be sampled and will be passed through a low pass filter 100 and an A/D converter 102. The results will be applied as local data to a digital filter 103 and then to backup protection 105 (such as for a current differential protection application) and will also be applied as local data for both conventional protection functions (section 104) and the BTOS and CBS (where applicable) protection functions (section 106). The "local" data for each section 104, 106 (section 104 is exemplary) from the A/D converter 102 is applied to, in each case, a channel delay compensation circuit 108, the output of which is applied to a local data resampler 110, the output of which is applied in turn to a digital filter 112 prior to being processed by the protection algorithms 114. The data from A/D converter 102 is also transmitted to the associated remote relay by transmit device 116. The electric current values from the companion circuitry at the remote relay are received by receive device 118 and applied to a resampler 120, the output of which is applied to a digital filter 122 and then to the protection algorithms 114.

Hence, a system has been described which provides BTOS protection within the context of a line differential or similar protection system which includes communication lines between relays. Communication lines are provided between two relays servicing each bus, wherein the backup communication line from the protection system is connected between the bus end relay communication lines, the electric currents into and out of each bus then being determined by the relays associated with the individual buses. The same arrangement (two buses, two lines) can be used for a current balance system.

Although a preferred embodiment of the invention has been described for purposes of illustration, it should be understood that various changes, modification and substitutions may be incorporated in the invention without departing from the spirit of the invention, which is defined in the claims which follow.

What is claimed:

1. A power system bus total overcurrent system for use with a part of a power system which includes two buses and first and second power lines which extend therebetween, comprising:
   a protective relay system, which includes protective relays associated with each of the first and second power lines, such that a first pair of relays measure current into and out of a first bus and a second pair of relays measure current into and out of a second bus;
   first and second communication lines connected, respectively, between the first pair of relays and the second pair of relays; and
   a third communication line connected between the first and second communication lines at the first and second buses, resulting in total current values into and out of the first and second buses.

2. A system of claim 1, wherein the protective relay system includes a current differential protection capability, including a communication line for providing current values between the two protective relays on each line, respectively.

3. A system of claim 2, including current transformers providing current values from each line for each relay in the protective relay system, wherein the current transformers provide current values for operation of both the line differential function and the bus total overcurrent system.

4. A system of claim 3, including a communication channel check to ensure the accuracy of the transmitted current values over the communication channel.

5. A power system current balance protection system for use with a part of a power system which includes two buses and first and second power lines which extend between the two buses, comprising:
   a protective relay system which includes protective relays associated with each of the first and second power lines, such that a first pair of relays measure current into and out of a first bus and a second pair of relays measure current into and out of a second bus, wherein each pair of relays process the current values into and out of its associated bus to determine the vector difference-current on each bus, wherein only the vector difference current on the bus of at least a preselected amount results in a trip of a circuit breaker at that location, which in turn results in a trip of a circuit breaker at the other end of the line adjacent the other bus.

6. A system of claim 5, including first and second communication lines connected between, respectively, the first and second pairs of relays.

* * * * *